United States Patent [19]
Ruana

[11] Patent Number: 5,146,809
[45] Date of Patent: Sep. 15, 1992

[54] METHOD OF SHAPING A BICYCLE HANDLEBAR AND APPARATUS THEREFORE

[76] Inventor: Bruce M. Ruana, 1905 N. Olive St., Santa Ana, Calif. 92706

[21] Appl. No.: 749,556
[22] Filed: Aug. 26, 1991
[51] Int. Cl.⁵ ............................................. B62K 21/26
[52] U.S. Cl. .................................................. 74/551.9
[58] Field of Search ................... 74/551.1, 551.8, 551.9

[56] References Cited
U.S. PATENT DOCUMENTS

| | | | |
|---|---|---|---|
| 4,380,093 | 4/1983 | Morgan | 74/551.9 X |
| 4,445,396 | 5/1984 | Shimano | 74/551.9 X |
| 4,522,083 | 6/1985 | Morgan | 74/551.9 |

*Primary Examiner*—Dirk Wright
*Attorney, Agent, or Firm*—Timothy T. Tyson

[57] ABSTRACT

A method and apparatus for shaping bicycle handlebars utilizing contoured forms (24, 26 and 28) and tape (30,32) is provided. The forms may be placed on the handlebars in accordance with the rider's needs and enclosed thereon by the tape. The forms may be contoured or molded to conform with the rider's hands and arms.

9 Claims, 4 Drawing Sheets

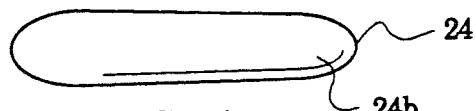
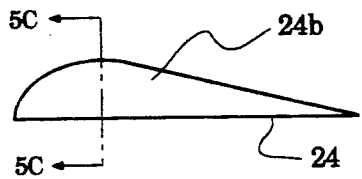
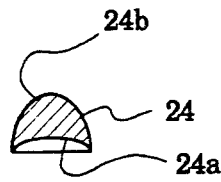
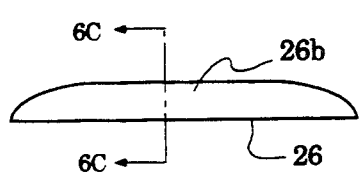
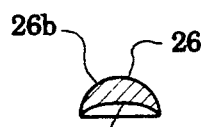
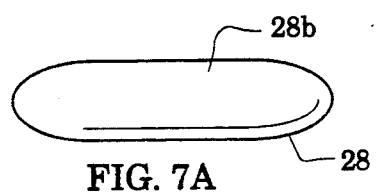
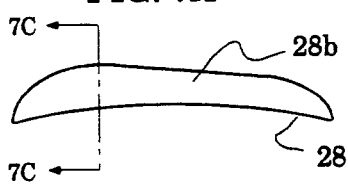
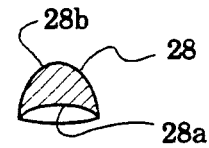
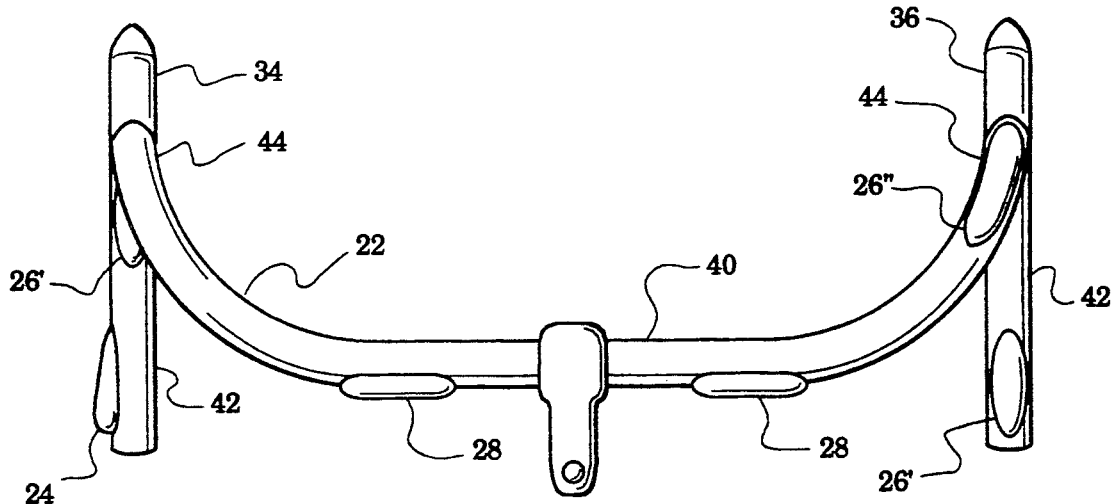

METHOD OF SHAPING A BICYCLE HANDLEBAR AND APPARATUS THEREFORE

TECHNICAL FIELD

The present invention pertains to bicycles and more particularly, to apparatus for shaping the handlebar thereof.

BACKGROUND ART

Riding a racing bicycle and gripping a rigid unshaped handlebar for an extended time can cause fatigue and even numbness of the hands and arms. Numerous attempts have been made to create a more comfortable bicycle handlebar including the following U.S. Pat. Nos.: D31,050, D31,802, D100,223, D144,446, D185,613, D204,119, D269,941, D287,568, 580,336, 583,781, 1,345,505, 1,421,098, 2,098,509, 2,205,769, 2,666,340, 3,016,763, 3,251,241, 3,960,340, 4,380,093, 4,403,787, 5,522,083, 4,445,396 and 4,878,397. Most, if not all, of these attempts cannot be modified by the rider to individual needs.

DISCLOSURE OF INVENTION

The present invention is directed to method and apparatus for shaping a bicycle handlebar to meet a rider's needs. Method and apparatus in accordance with the invention are characterized by forms contoured to conform with the hand and the handlebar and tape means configured for enclosing of the forms and the handlebar.

In a preferred embodiment three form embodiments are disclosed on a racing bicycle handlebar wrapped with resilient tape.

In accordance with a feature of the invention the contour of the handlebar may be shaped and reshaped by an individual rider to his or her needs.

The novel features of the invention are set forth with particularity in the appended claims. The invention will be best understood from the following description when read in conjunction with the accompanying drawings.

BRIEF DESCRIPTION OF DRAWINGS

FIG. 5A is a plan view of a form embodiment, in accordance with the present invention;

FIG. 5B is an elevation view of the form of FIG. 5A;

FIG. 5C is a view along the plane 5C—5C of FIG. 5B;

FIG. 6A is a plan view of another form embodiment, in accordance with the present invention;

FIG. 6B is an elevation view of the form of FIG. 6A;

FIG. 6C is a view along the plane 6C—6C of FIG. 6B;

FIG. 7A is a plan view of another form embodiment, in accordance with the present invention;

FIG. 7B is an elevation view of the form of FIG. 7A;

FIG. 7C is a view along the plane 7C—7C of FIG. 7B;

FIG. 8 is a view similar to FIG. 1 illustrating alternate placements of portions of the apparatus and FIG. 9 is a plan view of a bicycle illustrating the handlebar locations for placing the portions of the apparatus.

MODES FOR CARRYING OUT THE INVENTION

Figure 1:
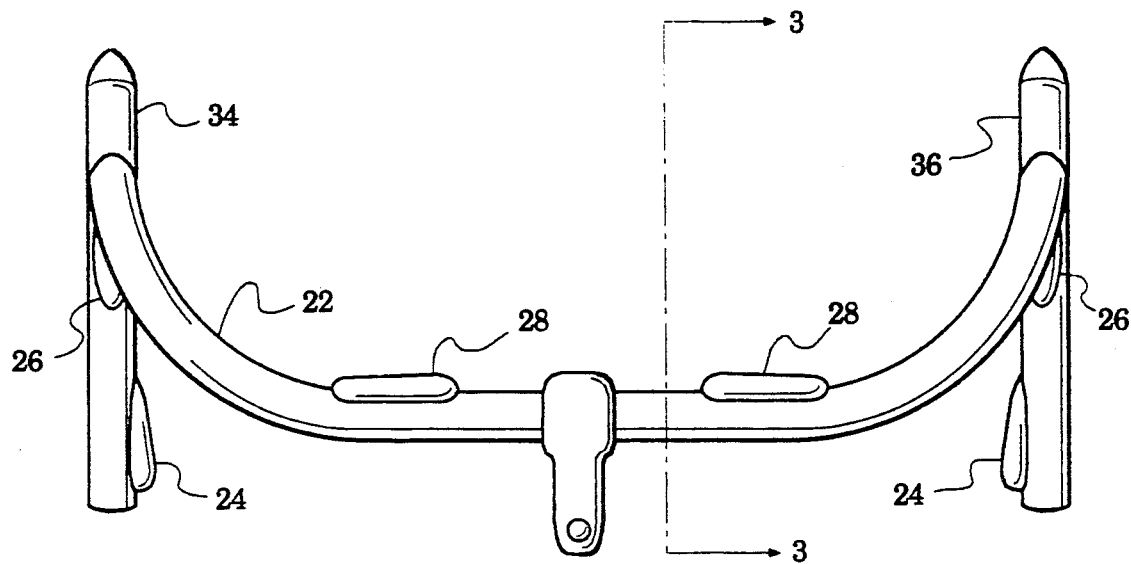
FIG. 1 is a plan view of a bicycle handlebar with portions of an apparatus for shaping thereof mounted thereon in accordance with the present invention.
Figure 2:
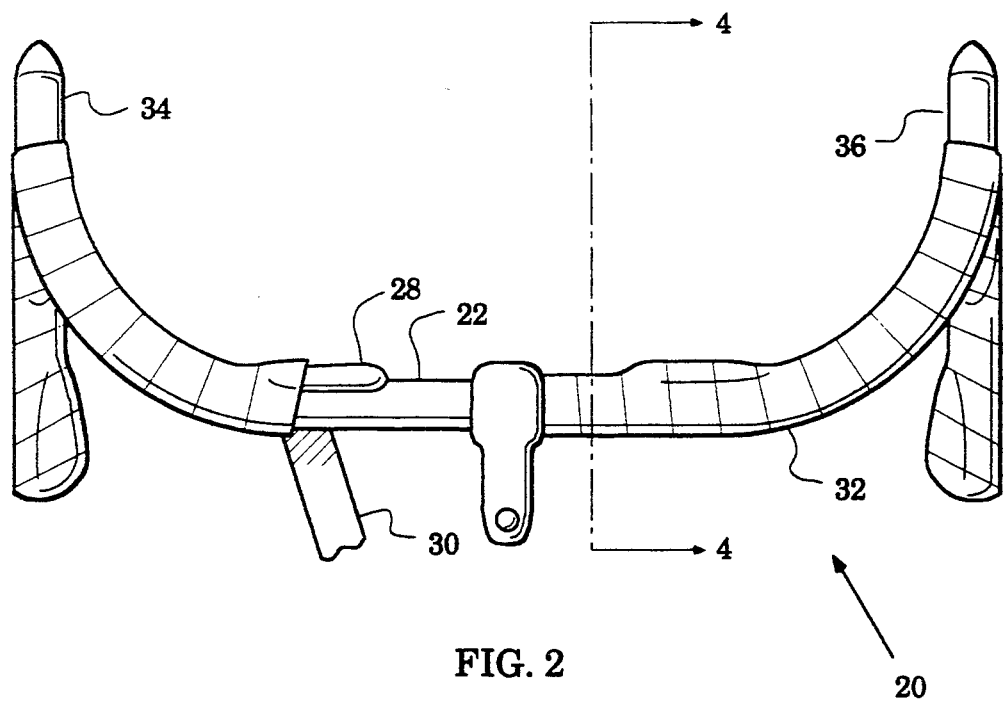
FIG. 2 is a view similar to FIG. 1 illustrating the addition of other portions of the apparatus for shaping the handlebar.

An apparatus embodiment 20 for shaping a bicycle handlebar, in accordance with the present invention, is illustrated mounted on a racing bicycle handlebar 22 in the plan views of FIGS. 1 and 2. The apparatus 20 has forms 24, 26 and 28 placed on the handlebar in the positions shown in FIG. 1 and enclosed thereon by tapes 30, 32 wrapped about the forms and the handlebar 22 as shown in FIG. 2. Thus the shape of the handlebar 22 can be customized to the needs of the bicycle rider. The forms may be moved and the tape rewrapped thereover when desired.

Figure 3:
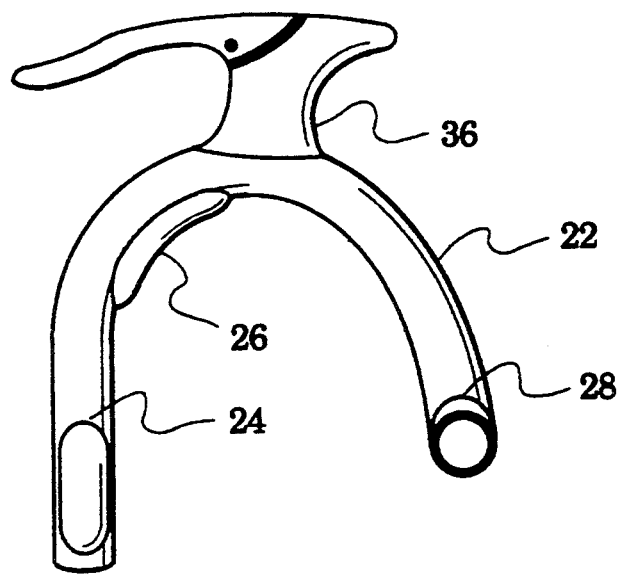
FIG. 3 is a sectional view along the plane 3—3 of FIG. 1.
Figure 4:
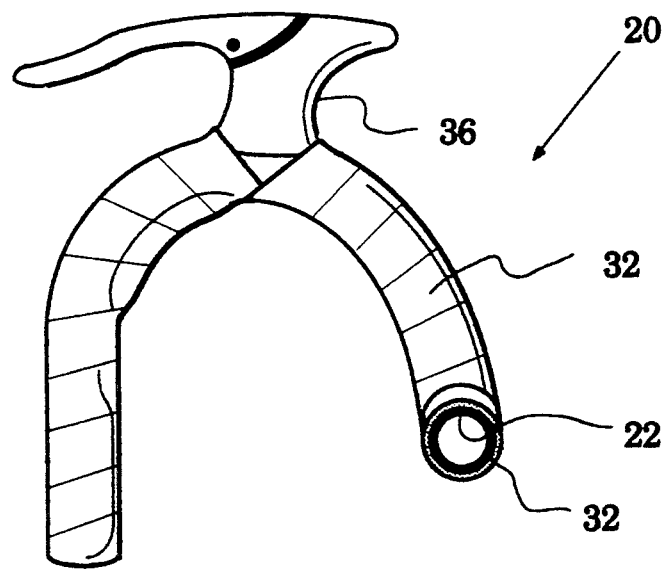
FIG. 4 is a sectional view along the plane 4—4 of FIG. 2.

FIG. 3 is a view along the plane 3—3 of FIG. 1 further illustrating the placement of the forms 24, 26 and 28. FIG. 4 is a view along the plane 4—4 of FIG. 2 illustrating the shape of the handlebar with the tape 32 installed over the forms. The tapes 30, 32 may be wrapped about the base of the brake mounts 34, 36 (brake mount 34 shown on FIGS. 3 and 4) and subsequently secured at each end by means well known in the art (e.g. electrical tape).

The form 24 is illustrated in the plan and elevation views of, respectively, FIGS. 5A and 5B. FIG. 5C is a sectional view along the plane 5C—5C of FIG. 5A. In views similar to FIGS. 5A, 5B and 5C, the forms 26, 28 are illustrated in, respectively, FIGS. 6A, 6B and 6C and FIGS. 7A, 7B and 7C. Form 24 has a first surface 24a that is contoured to substantially conform to the handlebar (22 in FIGS. 1 and 2) surface and a second surface 24b contoured to conform with at least a portion (e.g. fingers, palm, heel, thumb ball) of the rider's hand. Forms 26, 28 have similar surfaces 26a, 26b, 28a and 28b.

The forms 24, 26 and 28 may be fabricated of resilient materials (e.g. rubber, urethane foam) or rigid materials (e.g. phenolic, wood). The forms may also have a coating (not shown) to provide a degree of resilience (e.g. leather).

Figure 9:
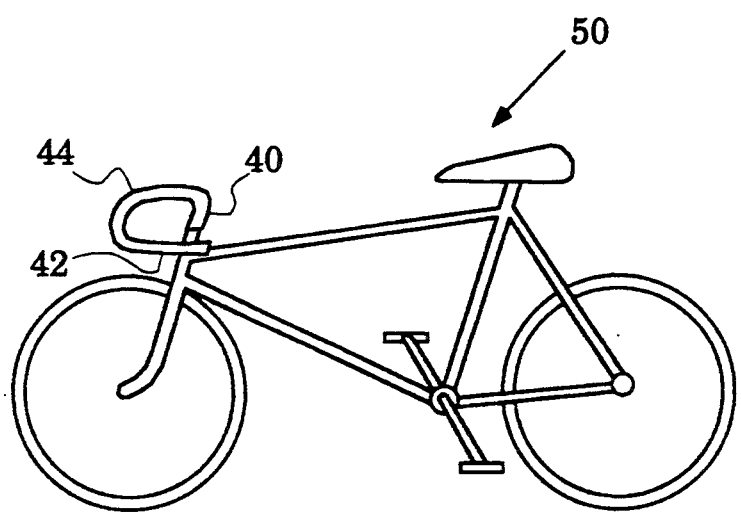

FIG. 8 is a view similar to FIG. 1 illustrating other possible locations for the forms 24, 26 and 28. In FIG. 8, forms 28 are placed on the rear of the crossover 40 (the crossover is the center portion of the racing handlebar 22). Also in FIG. 8, forms 24, 26 and 26' are shown placed on the drops 42 (the drop is the lower section of a racing handlebar 22) while form 26" is placed on the turn-of-bar 44 (the turn-of-bar is that section of a racing handlebar 22 connecting the drops and the crossover). These locations for the forms 24, 26 and 28 are further illustrated in FIG. 9 which is a plan view of a bicycle 50.

Riders often grasp the crossover 40 with both an overhead and an underhand grip and grasp other sections of the handlebar 22 in various grips depending on the situation and the need to alter the grip at times to avoid fatigue and numbness of the hands and arms. Sometimes riders even lean their arms on the handlebars and the apparatus (20 in FIG. 2) may also be arranged to conform therefor. Many other placements of the forms 24, 26 and 28, in addition to those shown in FIG. 8, are possible to meet these needs and depend only on the rider's preference. Other contours, in addition to those shown on forms 24, 26 and 28 may be configured from a suitable material. The forms may also be molded from a polymer or other material using the rider's hands as a mold.

The tape (30, 32 in FIG. 2) may be of a resilient material to add additional padding and shaping to the handlebar. The tape may also be of an elastic material to cause it to readily conform to the shape of the forms and the handlebar and firmly secure the forms in place. The tape may be cut to a width suitable for conforming to the forms and the handlebar. It may be desirable to have the width vary to enhance such conformity.

The combination of forms and tape may be arranged to provide a surface that naturally fills out the concavity of the palm of the hand. By selectively altering the diameter of the handlebar a stronger grip may be obtained because the hand is placed in a position more advantageous to the leverage action of the fingers. Not only is the grip strengthened but, since the fingers are in a more natural position, fatigue and numbness are reduced. The form and tape combination also allows weight to be dispersed over a larger area and dampens vibration.

The bicycle rider can always readjust the forms and tape as needed. Once an initial placement of the apparatus has been established, the rider can grip the shaped handlebar and determine how well it fits his hands. The rider may wish to try this arrangement for awhile as he senses, through tactile feedback, the conformity between his hands and the apparatus. If the rider determines that an adjustment is desired, the tape can be unwrapped, the forms repositioned and the tape re-wrapped. Thus the shape of the handlebar is under continuous control of the rider.

Although an apparatus embodiment (20 in FIG. 2) has been illustrated in combination with a racing bicycle handlebar it will be understood that the invention may be used with any style handlebar (e.g. trail, mountain).

From the foregoing it should now be recognized that a method for shaping a bicycle handlebar has been disclosed herein utilizing forms, tape and the handlebar in a configuration conforming to the rider's needs. Apparatus in accordance with the present invention is inexpensive, simple to use, may be altered to correspond to needs of different riding situations and times, and is responsive to individual preferences.

As the present invention has been described with reference to preferred embodiments, it is apparent that numerous modifications and rearrangements can be made with the equivalent result still embraced within the scope of the invention.

What is claimed is:

1. Apparatus for customized shaping of a bicycle handlebar, comprising:
   a form configured with a first surface conforming with the outer surface of a bicycle handlebar and with a second surface conforming with at least a portion of the human hand; and
   tape for securing said form to said handlebar with said first surface abutting said handlebar at a location thereon in accordance with a bicycle rider's preference.

2. Apparatus as defined in claim 1 wherein said portion comprises the fingers.

3. Apparatus as defined in claim 1 wherein said portion comprises the palm.

4. Apparatus of claim 1 wherein said form has a length along said second surface substantially equal to the width of a human hand.

5. Apparatus of claim 1 wherein said form comprises a resilient material.

6. Apparatus for customized shaping of a bicycle handlebar, comprising:
   a form configured with a first surface conforming with the outer surface of a bicycle handlebar and with a second surface molded to conform to at least a portion of a human hand; and
   tape for securing said form to said handlebar with said first surface abutting said handlebar at a location thereon in accordance with the bicycle rider's preference.

7. A bicycle with a shaped handlebar, comprising:
   a bicycle having a handlebar thereon;
   at least one form having a surface contoured to conform to at least a portion of the human hand and positioned on said handlebar; and
   tape wrapped about each said form said handlebar to enclose therein whereby the shape of said handlebar may be customized to the bicycle rider's needs.

8. A method of customizing the shape of a bicycle handlebar, comprising the steps of;
   configuring at least one form with a first surface to substantially conform to a handlebar and a second surface to substantially conform to at least a portion of the human hand;
   placing at least one form on said handlebar; and
   securing, with tape, said form to said handlebar with said first surface abutting said handlebar at a location thereon in accordance with a bicycle rider's preference.

9. The method of claim 8 further comprising the steps of;
   gripping the customized handlebar with a bicycle rider's hands;
   sensing, through tactile feedback from the hands, the conformity between said customized handlebar and the rider's hand; and
   repositioning, as indicated by said sensing step, any of said at least one form in accordance with the bicycle rider's preference.

* * * * *